(12) United States Patent
Kim et al.

(10) Patent No.: US 8,101,306 B2
(45) Date of Patent: Jan. 24, 2012

(54) FUEL CELL SYSTEM WITH FUEL REFORMING UNITS

(75) Inventors: Soonho Kim, Seoul (KR); Doohwan Lee, Daejeon-si (KR); Hyun-chul Lee, Yongin-si (KR); Eun-duck Park, Incheon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 771 days.

(21) Appl. No.: 11/496,588

(22) Filed: Aug. 1, 2006

(65) Prior Publication Data
US 2007/0031707 A1 Feb. 8, 2007

(30) Foreign Application Priority Data
Aug. 2, 2005 (KR) .................. 10-2005-0070646

(51) Int. Cl.
*H01M 8/06* (2006.01)
(52) U.S. Cl. ......... 429/412; 429/415; 429/420; 429/449
(58) Field of Classification Search .................. 429/17, 429/19
See application file for complete search history.

(56) References Cited

U.S. PATENT DOCUMENTS

| | | | |
|---|---|---|---|
| 5,637,415 A * | 6/1997 | Meltser et al. | 429/17 |
| 6,451,464 B1 * | 9/2002 | Edlund et al. | 429/19 |
| 6,838,062 B2 * | 1/2005 | Goebel et al. | 422/198 |
| 2002/0110504 A1 * | 8/2002 | Gittleman et al. | 422/190 |
| 2002/0160239 A1 * | 10/2002 | Cutright et al. | 429/13 |
| 2002/0160241 A1 * | 10/2002 | Huang | 429/19 |
| 2003/0012990 A1 | 1/2003 | Yamanashi | |
| 2003/0031900 A1 | 2/2003 | Tajima et al. | |
| 2004/0253493 A1 | 12/2004 | Kamijo | |
| 2007/0031707 A1 | 2/2007 | Kim et al. | |

FOREIGN PATENT DOCUMENTS

| | | |
|---|---|---|
| CN | 1383405 A | 12/2002 |
| CN | 1455966 A | 11/2003 |
| CN | 100463261 C | 2/2009 |
| JP | 63-078455 * | 4/1988 |
| JP | 2004-103358 | 4/2004 |
| JP | 2004-107100 | 4/2004 |
| JP | 2004-134299 | 4/2004 |
| JP | 2004-220949 | 8/2004 |
| JP | 2005/050788 | 2/2005 |

OTHER PUBLICATIONS

Machine translation of abstract for JP 63-078455.*
Japanese Office Action issued in 2006-210529 Japanese Patent Application on Feb. 2, 2010.

* cited by examiner

*Primary Examiner* — Keith Walker
(74) *Attorney, Agent, or Firm* — Christie, Parker & Hale, LLP

(57) ABSTRACT

A fuel cell system and an operating method of the same. The fuel cell system includes a carbon monoxide adsorbing device that is disposed at an exit of a shift reactor and removes carbon monoxide which is not completely removed in the shift reactor. Therefore, a start-up time of the fuel cell system is remarkably reduced without poisoning catalysts of electrodes of the fuel cell. An overall volume of the fuel cell system can be reduced since the carbon monoxide adsorbing device is only operating during the start-up, and thus the fuel cell system can be economically manufactured and operated. Additionally, the carbon monoxide adsorbent can be regenerated, thereby increasing economic efficiency of the fuel cell system.

6 Claims, 6 Drawing Sheets

FUEL CELL SYSTEM WITH FUEL REFORMING UNITS

CROSS-REFERENCE TO RELATED APPLICATIONS

This application claims the benefit of Korean Patent Application No. 2005-70646, filed on Aug. 2, 2005, in the Korean Intellectual Property Office, the disclosure of which is incorporated herein by reference.

BACKGROUND OF THE INVENTION

1. Field of the Invention

Aspects of the present invention relate to a fuel cell system and an operating method of the same, and more particularly, to a fuel cell system in which catalysts of electrodes are not poisoned and the start-up time is remarkably low, and an operating method of the fuel cell system.

2. Description of the Related Art

A fuel cell is a type of energy generating system in which energy from a chemical reaction between hydrogen contained in a hydrocarbon-based material such as methanol, ethanol or natural gas and oxygen is directly converted into electrical energy.

A fuel cell system includes a fuel cell stack and a fuel processor (FP) as main elements, and further includes a fuel tank, a fuel pump, etc., as sub-elements. The stack forms a main body of the fuel cell and includes a plurality of layers of unit cells which include membrane electrode assemblies (MEA) and separators.

The fuel pump supplies fuel stored in the fuel tank into the FP. The FP reforms and purifies the fuel to generate hydrogen, and supplies the generated hydrogen to the fuel cell stack. In the fuel cell stack, supplied hydrogen electrochemically reacts with oxygen to generate electrical energy.

In the FP, a hydrocarbon is reformed using a catalyst. If the hydrocarbon includes a sulfur compound, the catalyst is easily poisoned with the sulfur compound. Thus, a sulfur compound must be removed before the hydrocarbon is supplied to the FP. Therefore, a desulfurization process is performed before a reforming process (refer to FIG. 1).

When the hydrocarbon is reformed, not only hydrogen, but carbon dioxide and a small amount of carbon monoxide are generated. However, the reformed fuel should not be directly supplied to the fuel cell stack. Instead, a shift process should be performed to remove carbon monoxide since carbon monoxide poisons catalysts that are used for electrodes of the fuel cell stack. The concentration of carbon monoxide is preferably less than 5000 ppm.

Reactions such as a shift reaction, a methanation reaction and a PROX (preferential oxidation) reaction described in Reaction Schemes 1 through 3 below have been used to remove carbon monoxide (CO).

Reaction Scheme 1
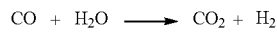

Reaction Scheme 2
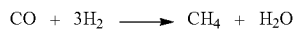

Reaction Scheme 3
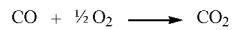

A temperature of the shift reactor must be 150° C. or higher to lower the carbon monoxide concentration to less than 5000 ppm. However, it takes about one hour to increase the temperature of the shift reactor to the desired temperature. The one-hour wait before using the electrical energy is disadvantageous to the fuel cell system, and thus there is a need to shorten the waiting time. However, a fuel cell system having a sufficiently low carbon monoxide concentration and quick start-up has not been reported.

SUMMARY OF THE INVENTION

Aspects of the present invention provide a fuel cell system having a short start-up time in which catalysts of electrodes are not poisoned by carbon monoxide. Aspects of the invention also provide an effective operating method of the fuel cell system.

According to an aspect of the present invention, there is provided a fuel cell system including a fuel processor that includes a reformer and a shift reactor; a fuel cell stack; a carbon monoxide adsorbing device having a carbon monoxide adsorbent therein; a first supplying unit to selectively supply carbon monoxide rich gas from a shift reactor to the carbon monoxide adsorbing device; a second supplying unit to selectively supply carbon monoxide lean gas obtained from the carbon monoxide adsorbing device to the fuel cell stack; and a third supplying unit to selectively supply carbon monoxide lean gas obtained from the shift reactor directly to the fuel cell stack.

While not required in all aspects, the fuel cell system may further include a fourth supplying unit to selectively supply a desorption gas to the carbon monoxide adsorbing device, and a first discharge unit capable of selectively discharging the desorbed carbon monoxide gas from the carbon monoxide adsorbent in the carbon monoxide adsorbing device.

According to another aspect of the present invention, there is provided a method of operating the fuel cell system described above including: a start-up operation including supplying carbon monoxide rich gas from the shift reactor to the carbon monoxide adsorbing device via the first supplying unit, supplying carbon monoxide lean gas obtained from the carbon monoxide adsorbing device to the fuel cell stack via the second supplying unit, and blocking the third supplying unit; and a steady state operation including blocking the first and second supplying units when an outlet temperature of the shift reactor is 150° C. or higher, and supplying carbon monoxide lean gas obtained from the shift reactor to the fuel cell stack using the third supplying unit.

In addition, while not required in all aspects, the method of the fuel cell system further includes regenerating a carbon monoxide adsorbent by supplying a desorption gas to the carbon monoxide adsorbing device via the fourth supplying unit and discharging the desorbed carbon monoxide gas from the carbon monoxide adsorbent in the carbon monoxide adsorbing device via the first discharge unit.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
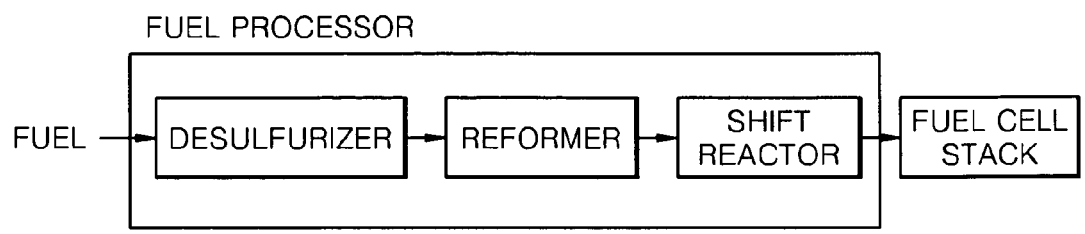
FIG. 1 is a flow diagram of a conventional fuel cell system.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In conventional fuel cell systems, a fuel processor to pretreat supplied fuel includes a reformer and a shift reactor. Typically, the following processes take place until the typical conventional fuel cell system reaches steady-state operation after the system starts.

First, fuel gas is supplied to a reformer and a reforming reaction is initiated. The concentration of carbon monoxide at an outlet of the reformer is about 10%. Even though fuel gas having a high carbon monoxide concentration is supplied to a shift reactor to eliminate the carbon monoxide, the carbon monoxide concentration exceeds 5000 ppm because the temperature of the shift reactor is initially too low to effectively remove the carbon monoxide. Accordingly, the gas discharged from the shift reactor is not supplied to the fuel cell stack but purged to the outside. About one hour is required to raise the temperature of the shift reactor sufficiently and thereby taken to lower the carbon monoxide concentration at the outlet of the shift reactor to less than 5000 ppm.

Meanwhile, the fuel processor of the fuel cell system according to an embodiment of the present invention further includes a carbon monoxide adsorbing device. When the fuel cell system starts up, a reformed fuel gas is passed directly through the carbon monoxide adsorbing device to remove carbon monoxide from the fuel gas that is supplied to the fuel cell stack (start-up mode). When the temperature of the shift reactor becomes high enough to increase a reaction rate to sufficiently remove carbon monoxide in less than a certain amount of time, the fuel gas bypasses the carbon monoxide adsorbing device (steady-state operation mode). Additionally, the carbon monoxide adsorbent in the carbon monoxide adsorbing device may be regenerated when the fuel cell system is not operating or when in the steady-state operation mode to prepare for a next start-up (regeneration mode).

Therefore, the use of the carbon monoxide adsorbing device of the fuel cell system according to an embodiment of the present invention provides several advantages including, but not limited to, the following. The start-up time can be remarkably shortened, the volume of the fuel cell system can be reduced by using the carbon monoxide adsorbing device during only the start-up, and thus the fuel cell system can be economically manufactured. Additionally, the carbon monoxide adsorbent can be regenerated, thereby reducing the manufacturing costs of the fuel cell system.

According to an embodiment of the invention, the details of each operation mode are as follows.

Start-Up Mode

When starting the fuel cell system, carbon monoxide rich gas is supplied from the shift reactor, which is incapable of sufficiently removing carbon monoxide due to its low temperature, to the carbon monoxide adsorbing device. The carbon monoxide adsorbing device lowers the carbon monoxide concentration to less than 5000 ppm and transfers the fuel gas to the fuel cell stack. Therefore, electricity can be immediately generated and used after the reforming reaction is initiated without waiting. However, continuous operation of the fuel cell system in the start-up mode is not preferable because the amount of carbon monoxide adsorbent held in the carbon monoxide adsorbing device is limited by the volume, weight and economical efficiency of the fuel cell system. The start-up mode may be converted to steady-state operation mode when the temperature of the shift reactor is sufficiently high to remove carbon monoxide.

Steady-State Operation Mode

When an outlet temperature of the shift reactor is 150° C. or higher and the concentration of carbon monoxide at an exit of the shift reactor is less than 5000 ppm after operation is initiated in the start-up mode, carbon monoxide does not need to pass through the carbon monoxide adsorbing device, and thus the fuel bypasses the carbon monoxide adsorbing device and is supplied directly to the fuel cell stack.

Regeneration Mode

The carbon monoxide adsorbing device is reused when the fuel cell system restarts. However, carbon monoxide is already adsorbed by the adsorbent in the carbon monoxide adsorbing device so that the efficiency of adsorbing carbon monoxide is decreased. Thus, there is a need to regenerate the carbon monoxide adsorbent.

In order to regenerate the carbon monoxide adsorbent, a desorption gas may be passed through the carbon monoxide adsorbing device. The carbon monoxide adsorbed into the carbon monoxide adsorbing device is desorbed and discharged by the desorption gas. The regeneration mode may be performed during the steady-state operation or while the fuel cell system is in a stop mode. For another example, the carbon monoxide adsorbing device may be removable from the fuel cell system to conduct the regeneration mode to regenerate the carbon monoxide adsorbent. However, the simultaneous regeneration and steady-state operation can be economical. The desorption gas may be any gas that does not contain carbon monoxide and is not limited particularly. The desorption gas may be, for example, inert gas such as helium, neon, argon and nitrogen or air. Preferably, the desorption gas may be air.

Figure 2:
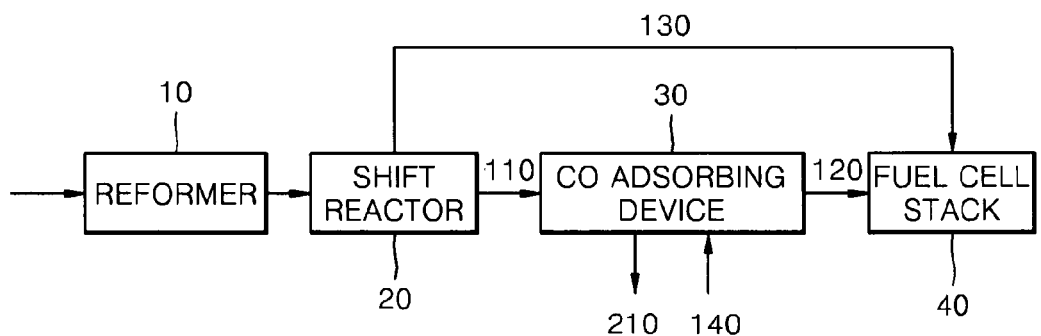
FIG. 2 is a flow diagram of a fuel cell system according to an embodiment of the present invention.

The fuel cell system and operating method thereof will now be described with reference to FIG. 2.

The fuel cell system includes a fuel processor including a reformer 10, a shift reactor 20 and a carbon monoxide adsorbing device 30 containing a carbon monoxide adsorbent, and a fuel cell stack 40. Particularly, the fuel cell system includes: a first supplying unit 110 capable of supplying carbon monoxide rich gas from the shift reactor 20 to the carbon monoxide adsorbing device 30, a second supplying unit 120 capable of supplying carbon monoxide lean gas from the carbon monoxide adsorbing device 30 to the fuel cell stack 40, and a third supplying unit 130 capable of directly supplying carbon monoxide lean gas from the shift reactor 20 to the fuel cell stack 40.

The fuel cell system may further include a fourth supplying unit 140 capable of supplying a desorption gas to the carbon monoxide adsorbing device 30, and a first discharge unit 210 capable of discharging the desorbed carbon monoxide gas from the carbon monoxide adsorbent in the carbon monoxide adsorbing device 30.

The carbon monoxide adsorbent can be any adsorbent capable of physically or chemically adsorbing carbon monoxide, but is not limited thereto. Examples of the carbon monoxide adsorbent include: Pt, Pd, Ru, Re, Ir or a compound thereof; Mo, W, V, Cr, Ta or a carbide thereof; nitrides of Mo, W, V, Cr, or Ta; molecular sieve 5A, molecular sieve 13X, or halogenated copper optionally supported on Y-zeolite; and Ag optionally supported on Y-zeolite, but the adsorbent is not limited thereto.

Figure 3A:
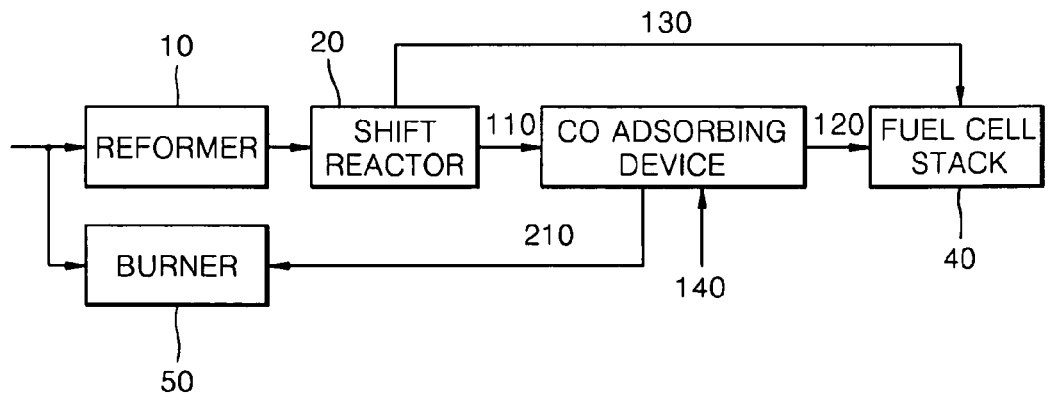
FIGS. 3A and 3B are flow diagrams of fuel cell systems according to embodiments of the present invention.

The start-up of the fuel cell system will now be described with reference to FIG. 3A. When the fuel cell system starts, fuel is supplied to a reformer 10 and a burner 50 for heating the reformer 10. The temperature of the reformer 10 quickly increases due to the heat from the burner 50. Carbon monoxide, capable of poisoning electrode catalysts, is generated during the reforming reaction within the reformer 10. Thus, the fuel passes through the shift reactor 20 to remove the carbon monoxide. However, during start-up, the temperature of the shift reactor 20 is not sufficiently high to reduce the concentration of the carbon monoxide to a desirable level. Thus, the fuel is passed through the carbon monoxide adsorbing device 30 by the first supplying unit 110 until the temperature of the shift reactor 20 becomes high enough to sufficiently remove the carbon monoxide. The concentration of carbon monoxide in the fuel after the fuel is passed through the carbon monoxide adsorbing device 30 may be less than 5000 ppm, which is sufficiently low for the fuel to be supplied to the fuel cell stack 40. Thus, the carbon monoxide lean gas is supplied to the fuel cell stack 40 by the second supplying unit 120. The fuel cell stack 40 produces electricity using the supplied gas and discharges carbon dioxide, unreacted fuel, vapor, etc. During start-up, the third supplying unit 130 is blocked to prevent the electrode catalysts of the fuel cell from being poisoned by carbon monoxide from the shift reactor.

The steady-state operation of the fuel cell system will now be described with reference to FIGS. 3A and 3B. The fuel cell switches from the start-up mode to the steady-state operation mode when the concentration of carbon monoxide at the exit of the shift reactor 20 is less than 5000 ppm.

In the steady-state operation mode, the fuel does not need to pass through the carbon monoxide adsorbing device 30 because carbon monoxide is already sufficiently removed in the shift reactor 20. Thus, the first supplying unit 110 and the second supplying unit 120 are blocked and the fuel is directly supplied from the shift reactor to the fuel cell stack 40 by opening the third supplying unit 130. That is, the fuel bypasses the carbon monoxide adsorbing device 30.

The regeneration of the carbon monoxide adsorbent of the fuel cell system will now be described with reference to FIGS. 3A and 3B. The regeneration mode may be performed during the steady-state operation or while the fuel cell system is stopped.

A desorption gas may be supplied to the carbon monoxide adsorbing device 30 by the fourth supplying unit 140. When the desorption gas is brought into contact with the adsorbent on which carbon monoxide is adsorbed, the adsorbed carbon monoxide is easily desorbed. Thus, when the desorption gas continuously passes through the carbon monoxide adsorbing device 30, the carbon monoxide adsorbent is regenerated by desorbing the adsorbed carbon monoxide.

The regeneration time of the carbon monoxide adsorbing device may vary according to the amount of the adsorbent and the amount of the adsorbed carbon monoxide. For example, the regeneration time may be 10 minutes to 120 minutes. Generally, when the regeneration is performed for less than 10 minutes, carbon monoxide may not be sufficiently removed, and thereby, the efficiency of removing subsequent carbon monoxide from the fuel is significantly reduced. Generally, when the regeneration is performed for more than 120 minutes, the regeneration of the adsorbent is not economical because the effect of regeneration would have been saturated.

The fourth supplying unit 140 and the first discharge unit 210 may be blocked after the regeneration of the adsorbent in the carbon monoxide adsorbing device is completed.

The carbon monoxide rich gas can be discharged by the first discharge unit 210. However, the carbon monoxide rich gas can alternatively be supplied to the burner 50 and discharged after complete combustion.

The first through fourth supplying units 110 through 140 may include, for example, a pipe and a valve. Features such as the diameter and material of the pipe may vary according to the composition and quantity of the fuel. For example, the valve may be a globe control valve when a control device 60 is used.

Figure 3B:
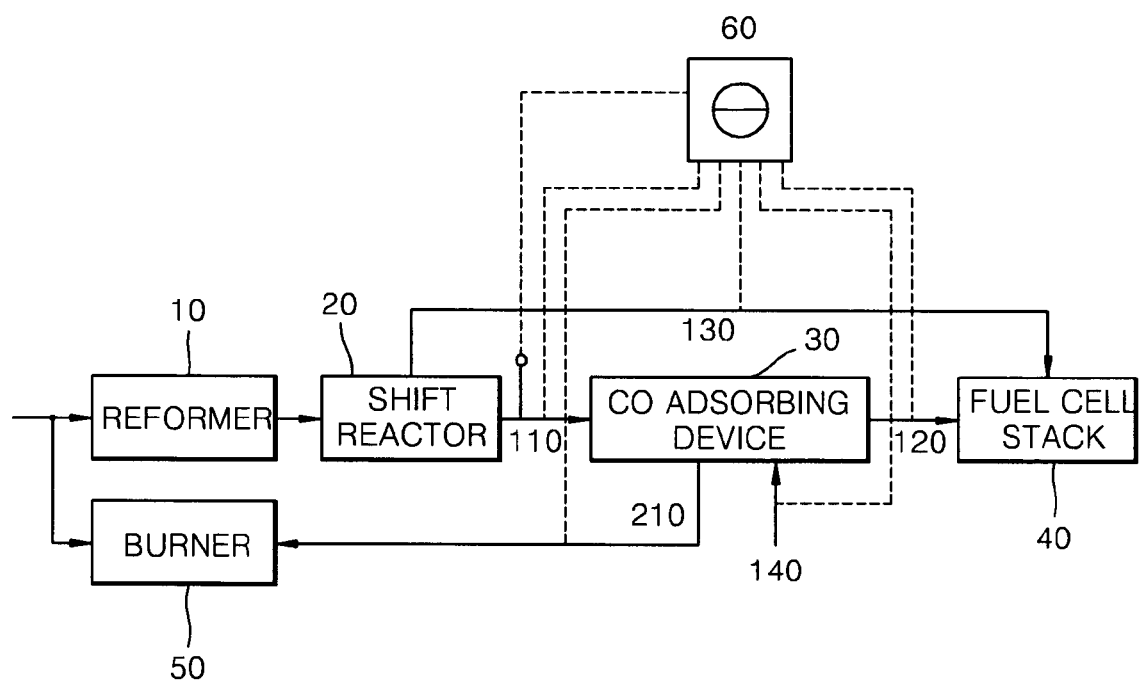

The fuel cell system according to an embodiment of the present invention may further include the control device 60 to control operations (refer to FIG. 3B). The control device 60 detects the concentration of carbon monoxide at the exit of the shift reactor 20. When the concentration of carbon monoxide exceeds 5000 ppm, the control device 60 opens the first supplying unit 110 and the second supplying unit 120, and blocks the third supplying unit 130, the fourth supplying unit 140 and the first discharge unit 210.

Additionally, when the concentration of carbon monoxide at the exit of the shift reactor 20 is less than 5000 ppm, the control device 60 blocks the first supplying unit 110 and/or the second supplying unit 120 and opens the third supplying unit 130

The fuel cell system according to an embodiment of the present invention and operating method thereof will now be described below with reference to FIGS. 4A to 4C. In the drawings, "▷ ◁" indicates an open valve and "▶ ◀" indicates a closed (blocked) valve.

Figure 4A:
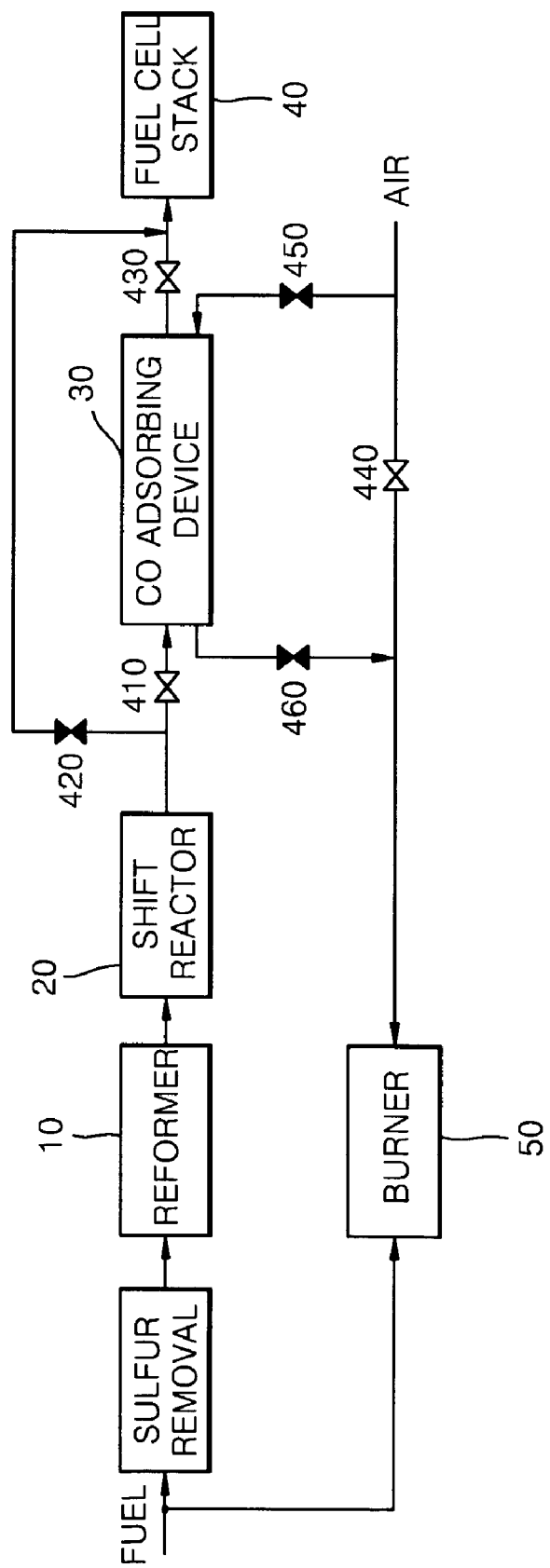
FIGS. 4A to 4C are flow diagrams of an operation of a fuel cell system according to an embodiment of the present invention.

FIG. 4A is a flow diagram illustrating the startup operation of the fuel cell system according to an embodiment of the present invention. The fuel is supplied to the reformer 10 and the burner 50 to increase the temperature of the reformer 10. The fuel is supplied to the carbon monoxide adsorbing device 30 by opening the valve 410 at the exit of the shift reactor 20. The fuel cannot by-pass the carbon monoxide adsorbing device 30 by simply closing the valve 420. Closing the valves 450 and 460 prevents external gas from flowing into the carbon monoxide adsorbing device 30.

Figure 4B:
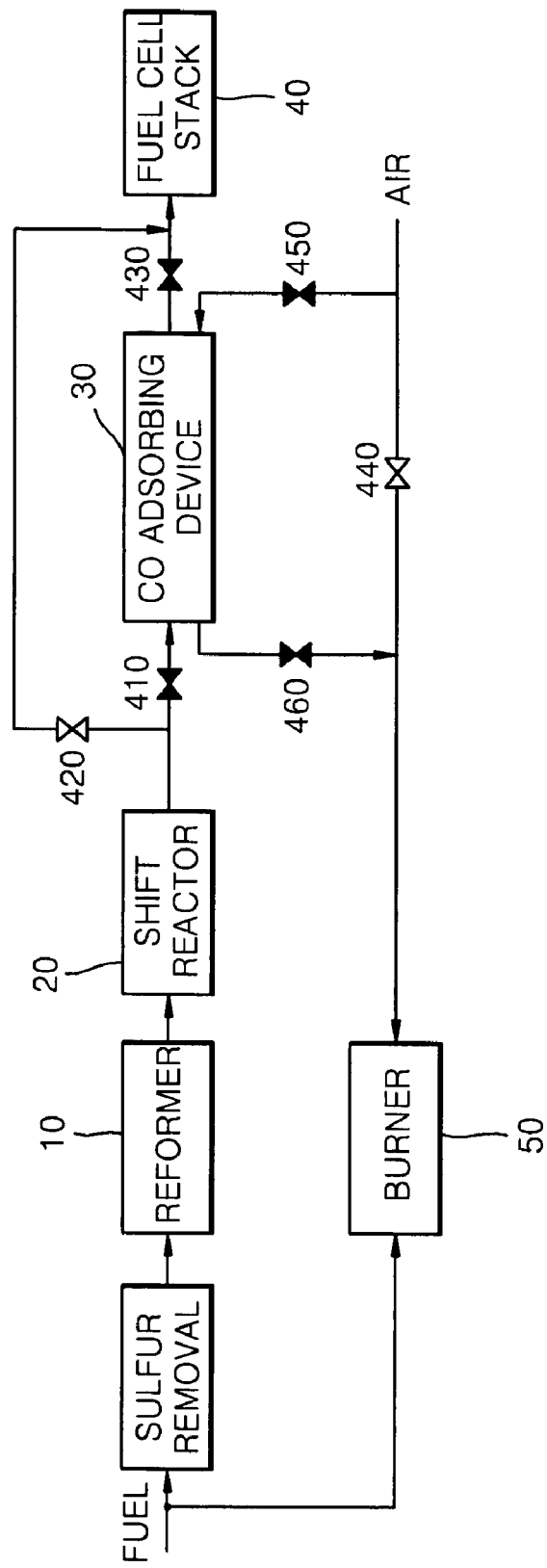
Figure 4C:
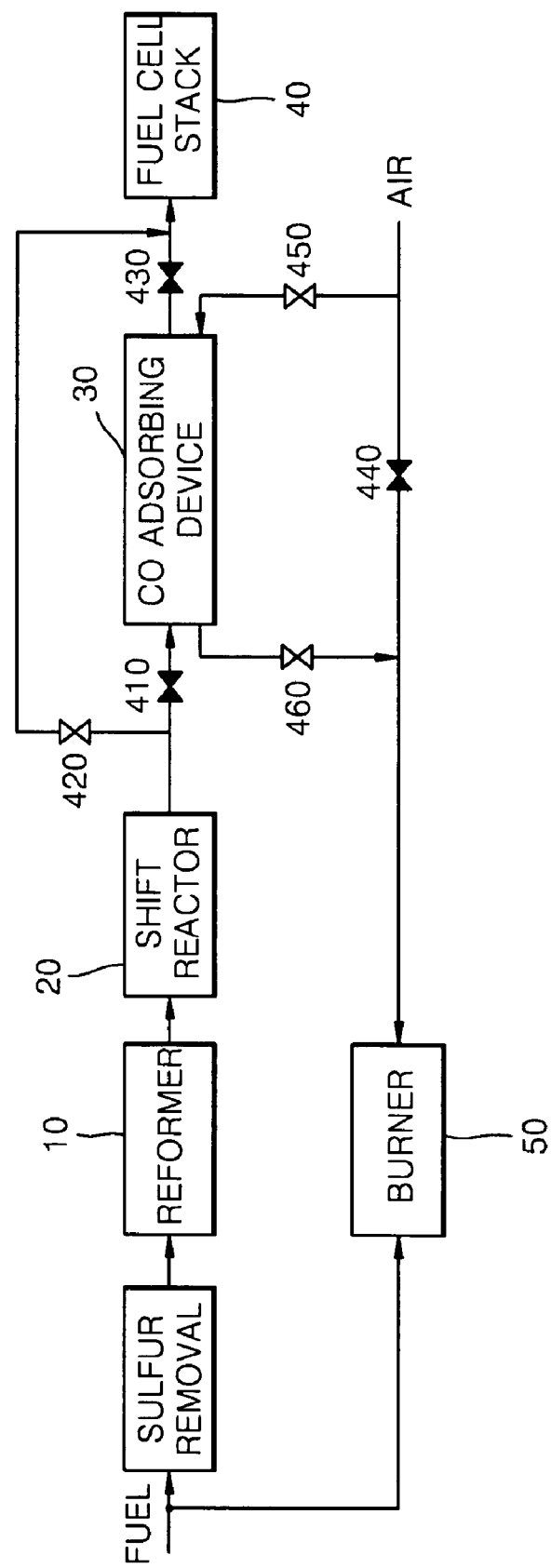

FIG. 4B is a flow diagram illustrating the steady-state operation of the fuel cell system according to an embodiment of the present invention. In the steady-state operation, the fuel does not need to pass through the carbon monoxide adsorbing device 30, and thus the valve 410 is closed to prevent the fuel from flowing into the carbon monoxide adsorbing device 30 and the valve 420 is open for the fuel to be directly supplied to the fuel cell stack 40.

Simultaneously, the regeneration of the carbon monoxide adsorbent may be carried out. In the regeneration, the valves 450 and 460 are open to allow air from outside to pass through the carbon monoxide adsorbing device 30 as shown in FIG. 4C. The valve 440 is closed so that the air being supplied to the burner pass through the carbon monoxide adsorbing device 30. The valves 450 and 460 may be closed after the completion of the regeneration.

The present invention will be described in further detail with reference to the following example. This example is for illustrative purposes only and is not intended to limit the scope of the present invention.

Example 1

Fuel consisting of 10% carbon monoxide and 90% hydrogen when bypassing the carbon monoxide adsorbing device was supplied to the device filled with the carbon monoxide adsorbent.

The fuel was supplied at a gas hourly space velocity (GHSV) of 962 hr$^{-1}$. The concentrations of hydrogen and carbon monoxide at the exit of the carbon monoxide adsorbing device were measured with respect to time, and the results are shown in FIG. 5.

Figure 5:
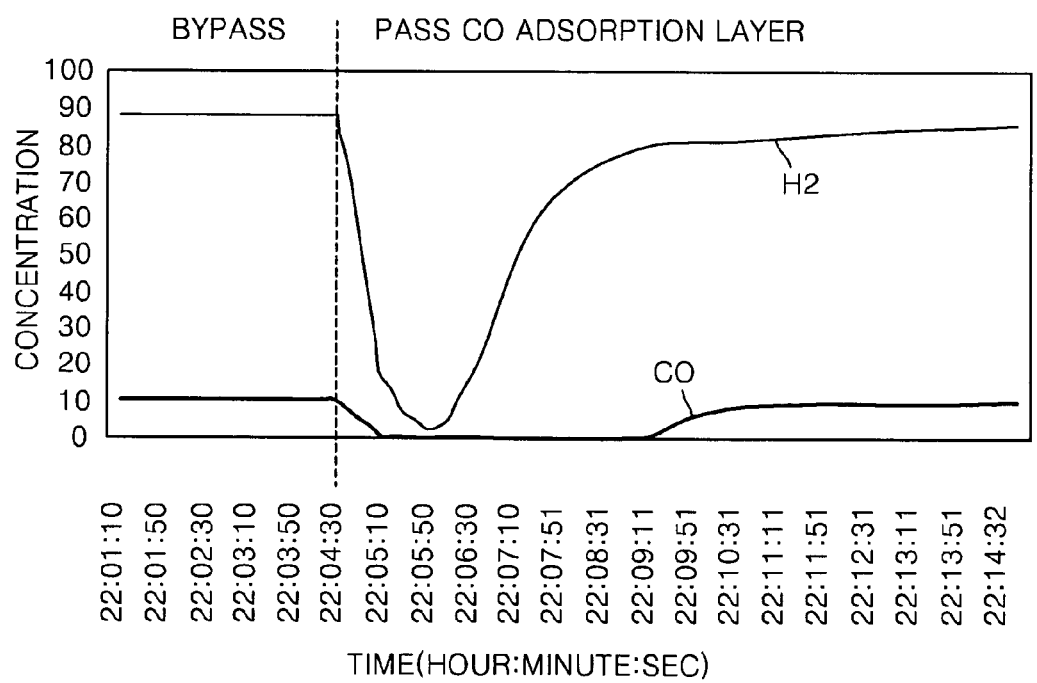
FIG. 5 is a graph illustrating the test results of a carbon monoxide adsorbing device.

As shown in FIG. 5, carbon monoxide included in the fuel was adsorbed and removed after passing through the adsorbing device. However, carbon monoxide was detected again after 5 minutes. This was caused by a breakthrough of the adsorbent by carbon monoxide and can be solved by increasing the quantity of the adsorbent. The concentration of hydrogen decreased initially because air occupying the carbon monoxide adsorbing device during the bypass was emitted with the hydrogen.

The concentration of carbon monoxide at the exit of the carbon monoxide adsorbing device before the breakthrough was 1131 ppm, which is lower than 5000 ppm. Therefore, the fuel cell stack using the fuel gas passed through the carbon monoxide adsorbing device can operate without poisoning the electrode catalysts in the fuel cell system.

In the fuel cell system according to aspects of the present invention, the start-up time can be remarkably shortened without poisoning electrode catalysts of the fuel cell, the volume of the fuel cell system can be reduced since the carbon monoxide adsorbing device is only operated during the start-up, and thus the fuel cell system can be economically manufactured and operated. Additionally, the carbon monoxide adsorbent can be regenerated, thereby increasing the economical efficiency of the fuel cell system.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fuel cell system comprising:
a fuel processor comprising a reformer and a shift reactor;
a fuel cell stack;
a carbon monoxide adsorbing device comprising a carbon monoxide adsorbent therein;
a first supplying unit to selectively supply carbon monoxide rich gas from the shift reactor to the carbon monoxide adsorbing device, the first supplying unit comprising a first pipe and a first valve between the shift reactor and the carbon monoxide adsorbing device;
a second supplying unit to selectively supply a first carbon monoxide lean gas obtained from the carbon monoxide adsorbing device to the fuel cell stack, the second supplying unit comprising a second pipe and a second valve between the carbon monoxide adsorbing device and the fuel cell stack, wherein the first carbon monoxide lean gas has a concentration of carbon monoxide of less than 5000 ppm;
a third supplying unit to selectively supply a second carbon monoxide lean gas obtained from the shift reactor directly to the fuel cell stack, the third supplying unit comprising a third pipe and a third valve between the shift reactor and the fuel cell stack, wherein the second carbon monoxide lean gas has a concentration of carbon monoxide of less than 5000 ppm;
a first discharge unit to selectively discharge a desorbed carbon monoxide gas from the carbon monoxide adsorbent in the carbon monoxide adsorbing device;
a burner to supply heat to the reformer, the first discharge unit being connected to the burner to supply the carbon monoxide rich gas including the desorbed carbon monoxide gas to the burner; and
a control device comprising a carbon monoxide detector at an exit of the shift reactor, wherein the control device is configured to open the first valve and the second valve and close the third valve when the carbon monoxide rich gas exiting the shift reactor has a concentration of carbon monoxide greater than 5000 ppm and the control device is configured to close the first valve and the second valve and open the third valve when the carbon monoxide rich gas exiting the shift reactor has a concentration of carbon monoxide is less than 5000 ppm.

2. The fuel cell system of claim 1, further comprising a fourth supplying unit to selectively supply a desorption gas to the carbon monoxide adsorbing device.

3. The fuel cell system of claim 1, wherein the carbon monoxide adsorbent comprises an adsorbent selected from the group consisting of Pt, Pd, Ru, Re, Ir or a compound thereof; Mo, W, V, Cr, Ta or a carbide thereof; a nitride of Mo, W, V, Cr, or Ta; molecular sieve 5A, molecular sieve 13X, or halogenated copper optionally supported on Y-zeolite; and Ag optionally supported on Y-zeolite.

4. The fuel cell system of claim 1, wherein the carbon monoxide adsorbing device is removable from the fuel cell system.

5. The fuel cell system of claim 1, further comprising a second discharge unit to selectively discharge gas generated in the fuel cell stack.

6. The fuel cell system of claim 5, wherein the second discharge unit is connected to the burner and supplies gas generated in the fuel cell stack to the burner.

* * * * *

UNITED STATES PATENT AND TRADEMARK OFFICE
CERTIFICATE OF CORRECTION

| | | |
|---|---|---|
| PATENT NO. | : 8,101,306 B2 | Page 1 of 1 |
| APPLICATION NO. | : 11/496588 | |
| DATED | : January 24, 2012 | |
| INVENTOR(S) | : Soonho Kim et al. | |

It is certified that error appears in the above-identified patent and that said Letters Patent is hereby corrected as shown below:

In the Claim

Column 8, Claim 1, line 29      Delete "is"

Signed and Sealed this
Nineteenth Day of November, 2013

Teresa Stanek Rea
*Deputy Director of the United States Patent and Trademark Office*